(No Model.) 2 Sheets—Sheet 1.
A. A. STINCHCOMB.
CORN PLANTER.
No. 564,658. Patented July 28, 1896.
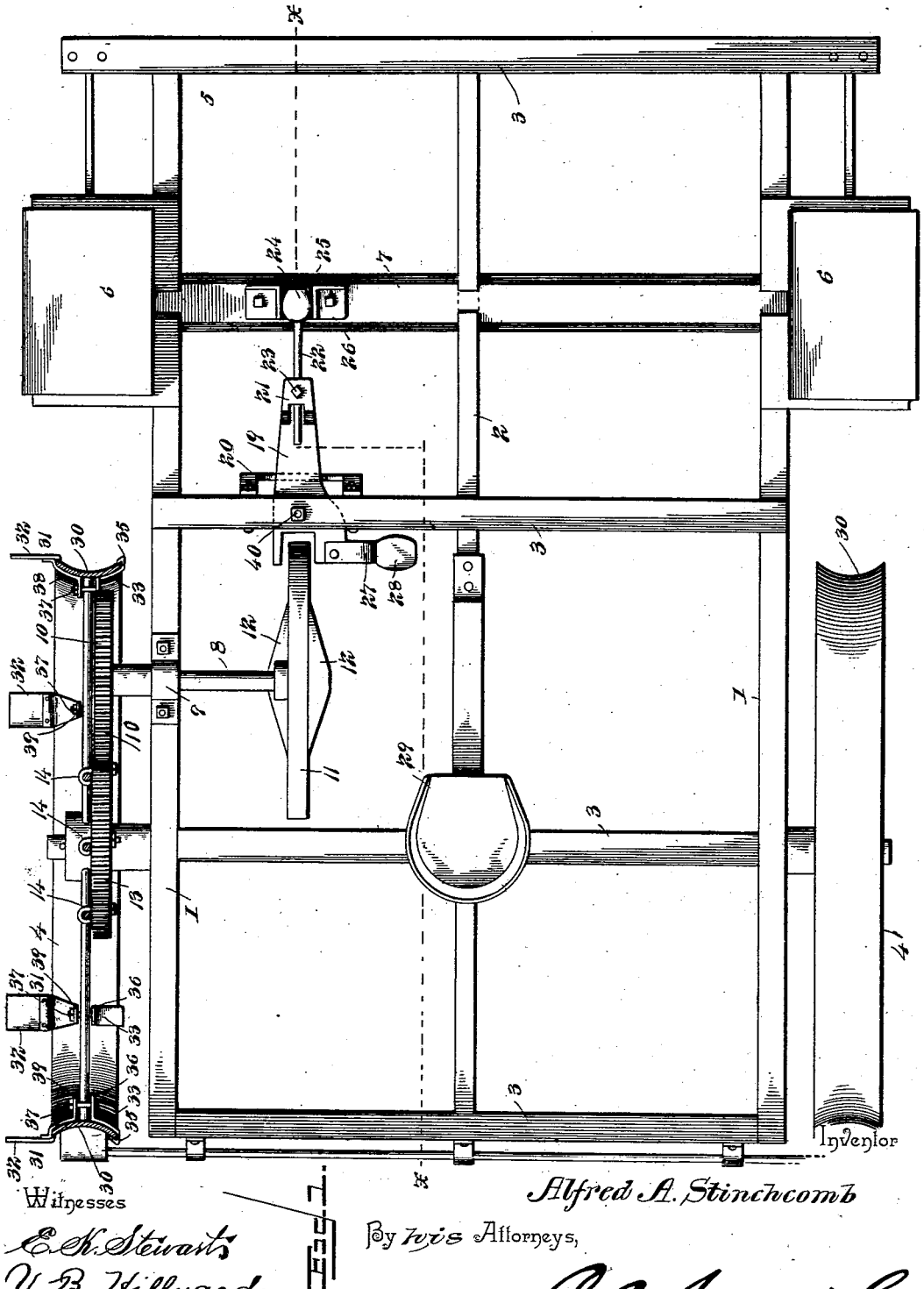
Witnesses
E. K. Stewart
V. B. Hillyard
Inventor
Alfred A. Stinchcomb
By his Attorneys,
C. A. Snow & Co.

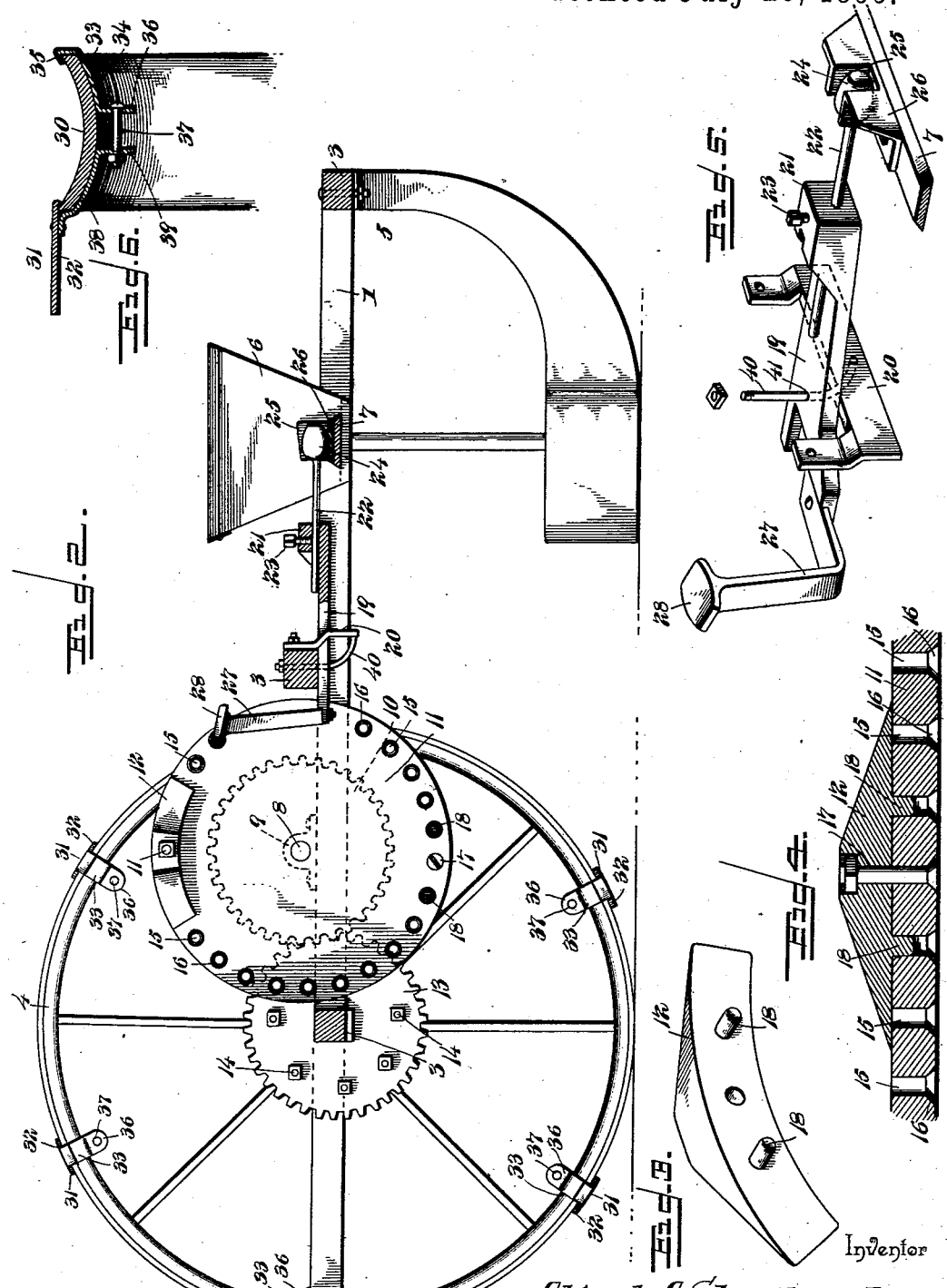

UNITED STATES PATENT OFFICE.

ALFRED A. STINCHCOMB, OF ST. MARGARETS, MARYLAND.

CORN-PLANTER.

SPECIFICATION forming part of Letters Patent No. 564,658, dated July 28, 1896.

Application filed January 17, 1896. Serial No. 575,890. (No model.)

*To all whom it may concern:*

Be it known that I, ALFRED A. STINCHCOMB, a citizen of the United States, residing at St. Margarets, in the county of Anne Arundel and State of Maryland, have invented a new and useful Corn-Planter, of which the following is a specification.

This invention aims to improve that class of planters designed for dropping or sowing the seed in check-rows, and aims, primarily, to provide an improved mechanism for actuating the seed-dropping devices, and which is adjustable so as to plant the seed at greater or less distances apart, as required.

A further object of the invention is to supply a power-driven wheel with interchangeable and adjustable tappets, which can be firmly secured in place by a single fastening and which are adapted to have their position shifted so as to cause the planting to be effected at proper intervals according to the nature of the seed and the condition of the soil.

Another object of the invention is to provide the ground-wheels with markers of peculiar construction and which can be readily applied to or shifted upon the said ground-wheels to indicate either the hills or the line of planting.

A still further purpose of the invention is to enable the operator or driver to have under control at all times the seed-dropping mechanism, whereby the latter can be thrown out of gear at any time simply by a pressure of the foot or hand, whereby the seed-dropping devices can be timed and caused to operate so as to plant the seed in check-rows.

The improvement also has for its object to simplify the actuating mechanism, to reduce the cost of planters so as to bring the same within reach of the average farmer or gardener, and, lastly, to increase the usefulness and effectiveness of this class of agricultural implements, whereby they are less liable to get out of repair and can be manipulated by any farm hand, and whereby the parts are readily accessible for cleaning, lubricating, repairing, or for any purpose requiring attention.

For a full understanding of the merits and advantages of the invention, reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a planter constructed in accordance with the principles of this invention. Fig. 2 is a longitudinal section thereof about on the line X X of Fig. 1. Fig. 3 is a detail view of a removable tappet. Fig. 4 is a detail view in section of a tappet and its supporting-wheel, showing clearly the relative arrangement of the fastening means. Fig. 5 is a detail view of the seed-slide-operating lever and its mounting. Fig. 6 is a detail view of a marker, showing it applied.

The same reference-characters denote corresponding and like parts in all the figures of the drawings.

The planter-frame comprises longitudinal side bars 1, an intermediate longitudinal bar 2, and transverse bars 3, and is supported upon ground-wheels 4 and a runner-section 5 of ordinary construction and applied in the usual way.

6 denotes the hoppers or seed-boxes, appropriately mounted and secured to the planter-frame, and 7 indicates the seed-slide, which in its reciprocating movements effects a dropping of the seed in the ordinary manner. These parts may be of any construction and relative arrangement, and are common, and are illustrated simply to show the application of the improvements.

A short shaft 8 is journaled in a bearing 9 secured to one of the side bars 1, and is provided at its outer end with a gear-wheel 10 and at its inner end with a wheel 11, which bears the tappets 12, and which will be designated hereinafter as the power-driven wheel. The gear-wheel 10 meshes with a toothed rim or companion gear-wheel 13 secured to the adjacent ground-wheel 4, and is driven thereby, the part 13 being secured to the spokes of the ground-wheel by hooked bolts 14 or other appropriate fastenings for attaining the same end.

The power-driven wheel 11 is provided near its peripheral edge with a series of transverse or horizontal openings 15, which are enlarged at their outer ends, as shown at 16, for the purpose of receiving the heads of the bolts 17, by means of which the tappets 12 are attached to the said power-driven wheel, and for receiving the teats 18 near the ends of the tappets 12, so as to prevent the latter from turning upon the bolts 17, and thereby admitting of a single bolt being employed for each tappet to secure the latter in place in a positive manner.

The tappets 12 are curved in their length to correspond with the circle of the wheel 11 and incline on their outer sides in opposite directions from a point midway of their ends, thereby enabling a tappet to be used upon either side of its supporting-wheel. By spacing the tappets at proper distances apart the seed-slide can be actuated so as to drop the seed to cause the planting to be effected in checks of any size.

The lever 19 is forked at its rear end, which embraces the sides of the wheel 11, and is fulcrumed between its ends upon the horizontal portion of a hanger 20 secured to one of the transverse bars 3, and is provided at its front end with a socket 21, in which is placed a rod 22, being held therein in the located position by means of a binding-screw 23 mounted in an opening in the the socket 21. The front end of the rod 22 is formed with a ball 24 which enters a notch or seat 25 in a casting 26, having connection with the seed-slide 7. By having the rod 22 adjustably connected with the lever 19 provision is had to allow for variations in the assembling of the parts so that the ball 24 can be adjusted so as to operate in the notch 25. An arm 27 is attached at its lower end to one of the bifurcations or forks of the lever 19 and extends vertically, and is provided at its upper end with a rest or expanded portion 28 to receive the foot or hand of the driver or operator when it is required to throw the seed-dropping mechanism out of gear for any purpose, and this rest 28 is within convenient reach of the driver's seat 29, which is attached at a convenient point to the planter-frame.

The ground-wheels 4 have broad treads 30, which are concaved in their outer faces between their edges, so as to obtain an extended bearing upon the mellow land and so as to compress the soil upon the planted seed.

The markers 31 consist, essentially, of two parts, a plate 32 and a clamp 33, which latter consists of a strip 34 having its outer end 35 recurved so as to embrace and receive an edge portion of the tread or rim 30 and having its inner end 36 bent at approximately right angles and apertured to receive a bolt 37, and a companion strip 38 having its outer end secured to the plate 32 a short distance from the inner end of the latter, and having its end 39 bent at approximately right angles and apertured to receive the same bolt 37 by means of which the two strips are caused to grip and bind against the edges of the rim or tread 30, the space between the inner end of the plate 32 and the strip 38 receiving the edge portion of the rim 30. After the parts are properly assembled the marking-plates 32 will project laterally from the rims or tread-surfaces of the ground-wheels and indent the surface of the ground so as to indicate the hills or rows of planting.

By constructing the markers in the manner set forth and illustrated they can be readily adjusted to the required position upon the rims of the ground-wheels, so as to designate with accuracy and certainty the hills of corn or planting of other grain.

The hanger 20 is substantially U-shaped and its horizontal portion forms a fulcrum for the lever 19 to tilt upon when operated to throw the seed-dropping mechanism out of gear, and it is strengthened and braced by means of an arm 40 which extends rearwardly from its horizontal portion and curves upwardly and passes through the tranverse bar to which the hanger is attached, and extends through an opening 41 in the lever 19, and this arm 40 provides a fulcrum or pivot for the lever 19 to vibrate upon in its oscillatory movements when reciprocating the seed-slide.

The planter is operated in substantially the same manner as other planters of similar nature, and is drawn over the field, the furrows to receive the grain being opened by the runner section 5 in the usual way and the seed being deposited into the furrows in the ordinary way and covered either by the rims of the ground-wheels or in any approved manner. When it is required to throw the seed-dropping mechanism out of gear the rear end of the lever 19 is depressed in the manner set forth, when the desired end is attained.

Having thus described the invention, what is claimed as new is—

1. In a planter, the combination with the seed-dropping mechanism, and a lever for transmitting motion thereto, of a power-driven wheel having a series of transverse or horizontal openings extending through both sides and which are enlarged at their ends, a tappet having teats to enter the enlargements of the openings, and having a countersunk bolt opening intermediate of the teats and a fastening-bolt for securing the tappet to the said wheel and having its head seated in the enlarged end of the proper opening and having its nut fitted into the countersink of the tappet, substantially in the manner set forth.

2. In a planter, the combination of a power-driven wheel having a series of openings contiguous to its peripheral edge extending through both sides and which have their ends enlarged, a tappet curving in its length and fitted to either side of the wheel and having teats projecting from its inner side to enter corresponding openings of the said wheel, and having its outer side oppositely inclined from a middle point, and a bolt for securing the tappet to either side of the said power-driven wheel, substantially as set forth.

3. In a planter, the combination of a seed-slide, a power-transmitting lever for operating the seed-slide, a hanger for supporting the lever, and a curved arm having connection with the horizontal portion of the hanger and passing vertically through the lever and forming a fulcrum for the said lever to tilt horizontally about, substantially as set forth.

4. In a planter, the combination of a seed-slide, a lever mounted to tilt vertically and horizontally and detachably connected with the seed-slide, a rest having connection with the rear end of the said lever and adapted to be pressed upon by the hand or foot, and actuating mechanism for the said lever, substantially as and for the purpose set forth.

5. In a planter, the combination of a seed-slide, a notched casting secured to the seed-slide, a power-transmitting lever having a rest at its rear end and a socket at its front end, a rod adjustably secured within the socket of the lever and enlarged at its front end to operate in the notched casting, a hanger for supporting the lever, and a curved arm having connection with the horizontal portion of the hanger and passing vertically through the said lever and forming a fulcrum therefor, substantially as set forth.

6. In a planter, the combination with the rim of a ground-wheel, of a marker comprising a plate and a clamp, the latter consisting of two strips having their inner ends bent about at right angles and apertured, the outer end of one strip being recurved to embrace an edge portion of the rim, and the outer end of the other strip being attached to the plate a short distance from its inner edge and forming a space with said edge to receive the opposite edge portion of the rim, and a bolt passing through the apertured bent ends of the strips to secure the latter in place, substantially as shown and described.

7. In combination, a power-driven wheel having a series of openings disposed near its edge and enlarged at their ends, tappets removably and adjustably fitted to the sides of the said wheel and having teats to enter the enlarged ends of the openings, a lever bifurcated at its rear end to embrace the sides of the power-driven wheel, an arm extending upwardly from the rear end of the lever and expanded at its upper end, a rod adjustably connected with the front end of the lever and having a ball at its outer end, a casting notched in its top side to receive the said ball, and a seed-slide supporting the said casting and operated by means of the said lever, substantially as and for the purpose set forth.

In testimony that I claim the foregoing as my own I have hereto affixed my signature in the presence of two witnesses.

ALFRED A. STINCHCOMB.

Witnesses:
   HARRY C. BASIL,
   ROBERT H. WELCH.